Sept. 13, 1960     D. L. HUGHES ET AL     2,952,096
AUTOMATIC APPARATUS FOR ACCELERATED PRODUCTION
OF GREEN FEED FOR LIVE STOCK
Filed July 15, 1957     2 Sheets-Sheet 1
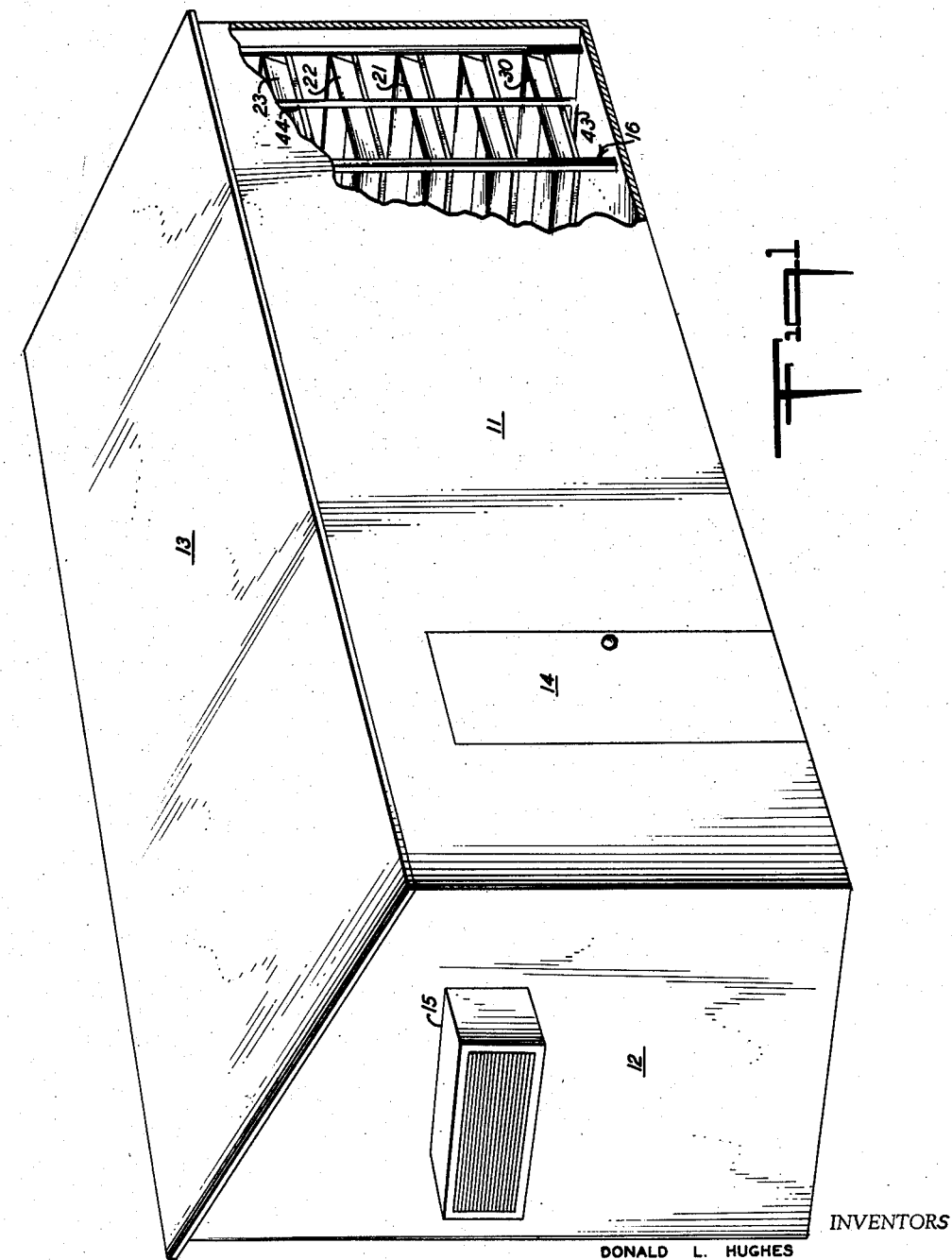
INVENTORS
DONALD L. HUGHES
WALTER W. POLLACK
BERNARD SCHWARTZMAN
SIMON GOLDBERG
BY
ATTORNEYS

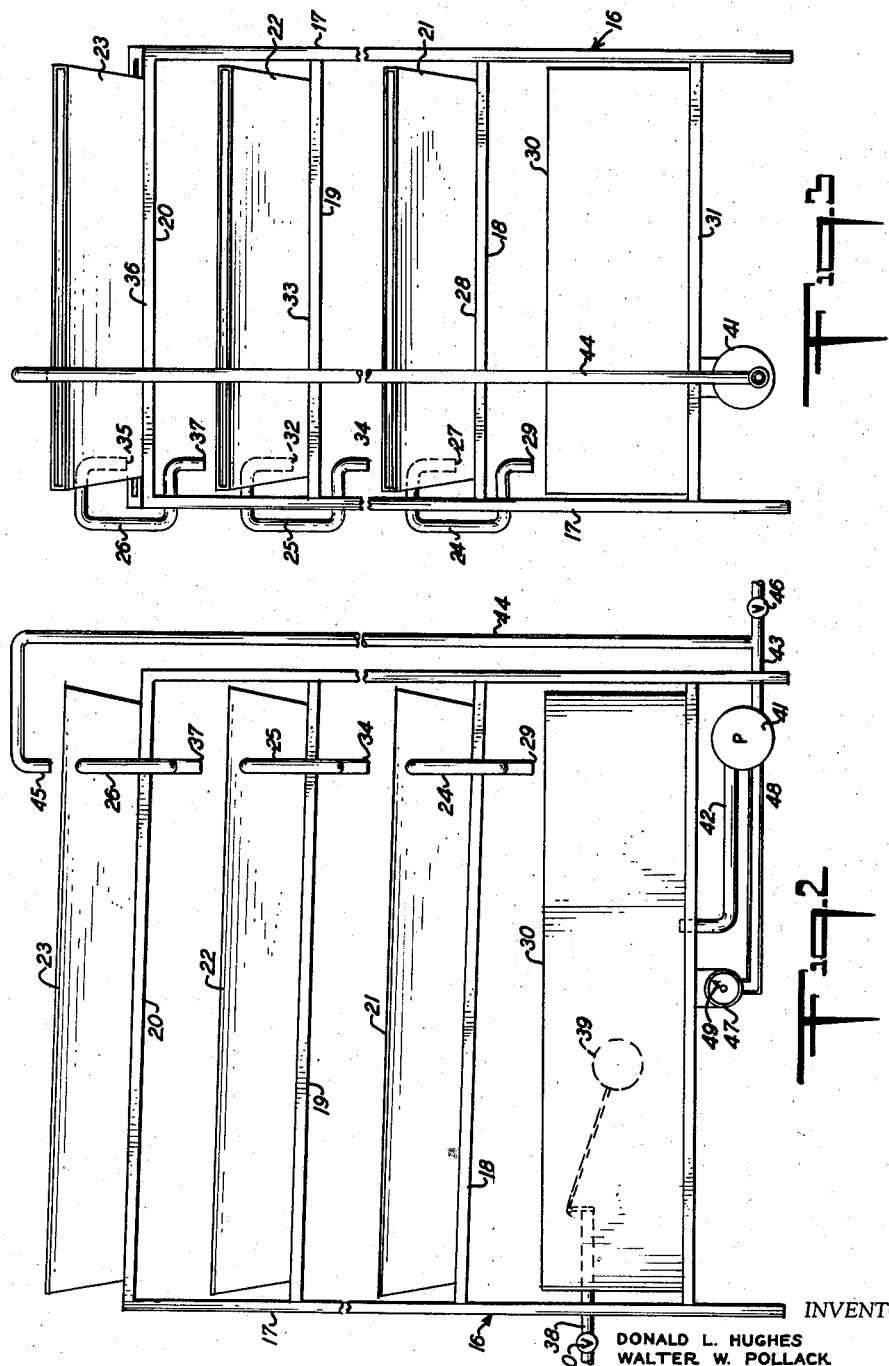

United States Patent Office 2,952,096
Patented Sept. 13, 1960

2,952,096
AUTOMATIC APPARATUS FOR ACCELERATED PRODUCTION OF GREEN FEED FOR LIVE STOCK

Donald L. Hughes, 1036 Roosevelt Ave., York, Pa.; Walter W. Pollack, 2909 Blue Ridge Ave., Silver Spring, Md.; Bernard Schwartzman, 3636 16th St. NW., Washington, D.C.; and Simon Goldberg, 208 Logan Blvd., Altoona, Pa.

Filed July 15, 1957, Ser. No. 671,863

7 Claims. (Cl. 47—1.2)

This invention relates to agriculture and more particularly to an apparatus for automatically producing green feed for livestock at an accelerated rate or in excess of natural growth and providing for the production of a relatively large volume of feed when compared to the space requirements of the apparatus.

As is well known, live stock and particularly dairy cattle provide highest milk production when sufficient quantities of fresh green feed are available for feeding, but this requires the use of a relatively large area of land in order to raise sufficient green feed and furthermore, in sections of the country where such land cannot be cultivated over a major portion of the year, there will be periods when such green feed will not be available. Consequently, any apparatus which will provide for the production of a sufficient quantity of green feed, regardless of weather conditions and the particular location in the country and which may be installed in a minimum of space represents a significant step forward in the art, since in addition to providing sufficient quantities of green feed at all periods of the year, the land formerly necessary for raising such feed will be made available for use in raising other crops.

It is accordingly an object of the invention to provide an automatic apparatus for accelerated production of green feed for live stock, which apparatus including a suitable enclosure may be conveniently erected at any desired location and which will occupy a minimum of space when compared to the quantity of feed produced thereby.

A further object of the invention is the provision of an automatic apparatus for accelerated production of green feed for live stock in which such feed is grown from seeds under controlled conditions of temperature and humidity and in which automatic means is provided for supplying a chemical nutrient to accelerate the growth of such feed.

A still further object of the invention is the provision of an automatic apparatus for accelerated production of green feed for live stock which may be operated continuously and which in an area of approximately two hundred and forty square feet will produce as much feed as could normally be harvested on forty to eighty acres of land cultivated the year round.

Another object of the invention is the provision of an automatic apparatus for accelerated production of green feed for live stock in which the only attention required is the deposition of seeds in the apparatus, the provision of a supply of nutrient liquid and the removal of the mature growth at the appropriate time.

Another object of the invention is the provision of an automatic apparatus for accelerated production of green feed for live stock, which apparatus including a normally hermetically sealed enclosure therefor, as well as means for maintaining controlled conditions of temperature and humidity may be conveniently and economically constructed from readily available materials and erected and installed by relatively unskilled labor thereby reducing costs to a minimum.

A further object of the invention is the provision of an automatic apparatus for accelerated production of green feed for live stock, which apparatus may operate continuously and will produce feed at a substantially uniform rate regardless of weather conditions.

Further objects and advantages of the invention will be apparent from the following description taken in conjunction with the accompanying drawings wherein:

Fig. 1 is a view in perspective showing an enclosure for the feed growing apparatus of this invention and with parts broken away to show the disposition of the apparatus within the enclosure;

Fig. 2 a front elevation of an apparatus constructed in accordance with this invention for the accelerated production of green feed; and Fig. 3 a side elevational view of the apparatus shown in Fig. 2.

With continued reference to the drawing, there is shown in Fig. 1, a suitable enclosure 10 for the apparatus of this invention, which enclosure may be prefabricated if desired and may include suitable side and end walls 11 and 12, as well as a roof 13 which may be inclined in order to shed rain in the event the enclosure is installed out of doors.

An access door 14 may be provided in one of the walls, such as the side wall 11 and it is to be understood that the enclosure 10 is normally hermetically sealed except upon opening of the door 14 and that the atmosphere within the enclosure 10 will be controlled as to conditions of temperature and humidity by a suitable air conditioning unit 15 which may be installed in a wall of the enclosure 10, such as the wall 12 and, of course, the air conditioning unit 15 may be of a suitable size and type to accomplish the results desired.

As best shown in Figs. 2 and 3, there may be provided one or more racks 16 constructed from suitable corner posts 17 and being provided with a plurality of vertically spaced shelves 18, 19 and 20 which serve to support culture pans 21, 22 and 23. While only three shelves and pans are shown in the drawings, it is to be understood that this is for illustrative purposes only and that any number of shelves and pans may be provided commensurate with the rate of production required and the space available to accommodate the racks and pans.

The pans 21, 22 and 23 are slidably supported on the shelves 18, 19 and 20 and may be conveniently removed therefrom and replaced during operation of the apparatus and as clearly shown in Fig. 3, culture pans 21, 22 and 23 are provided with self-priming syphons 24, 25 and 26 respectively. The inlet end 27 of syphon 24 is located in close proximity to the bottom 28 of pan 21 and the outlet end 29 of the syphon 24 is disposed above the open top of a nutrient liquid reservoir comprising a tank 30 supported on a shelf 31 secured to the lower portion of the rack 16.

In a similar manner, the inlet end 32 of the syphon 25 is disposed in close proximity to the bottom 33 of the pan 22 and the outlet end 34 of the syphon 25 is disposed above the culture pan 21 when the pans are in place on the rack 16. The inlet end 35 of the syphon 26 is disposed in close proximity to the bottom 36 of the pan 23 and the outlet end 37 of the syphon 26 is disposed above the pan 22, as clearly shown in Fig. 3 of the drawing.

A water supply conduit 38 is connected to the tank 30 and a float valve 39 is provided in the conduit 38 to automatically maintain a predetermined liquid level in the tank 30. A main shut off valve 40 is provided in the water supply conduit 38 to prevent flow of water to the tank 30 when desired.

A power drive pump 41 is provided with an intake conduit 42 connected to the lower portion of the tank 30 and the pump 41 is provided with a discharge conduit 43 connected through a conduit 44, the discharge end 45 of which is disposed to empty into the uppermost culture pan 23 on the rack 16. The discharge conduit 43 of the pump 41 may also be provided with a drain valve 46 to permit drainage of the contents of the tank 30, but of course, if desired, a separate drain having a valve therein may be attached to the tank 30.

In order to automatically control the operation of the pump 41 there may be provided a time responsive adjustable switch means 47 connected by suitable electrical conductors 48 to the motor driving the pump 41 and means 49 may be provided on the switch 47 to permit manual setting of the same for operation of the pump 41 at predetermined intervals and for a predetermined period of time.

In operation, the seed for the particular type of feed to be produced is pre-soaked in a suitable vat, not shown, and after soaking of such seed for an appropriate period of time the seed is placed in the culture pans 21, 22 and 23 and the pans positioned on the shelves 18, 19 and 20 of the rack 16 as clearly shown in the drawing. The tank 30 is filled with water to a predetermined level and a chemical nutrient which is commercially available and the composition of which is not believed pertinent to this description, is placed in the tank 30, at which time the automatic time responsive switch 47 is adjusted to provide for operation of the pump 41 at predetermined intervals and for a predetermined period of time. As a result of the operation of pump 41 nutrient liquid will be transferred from the tank 30 to the uppermost culture pan 23 and upon reaching a level above the highest point of the syphon 26, the syphon action will be established and the liquid will drain from the pan 23 into the next lower pan 22. In a similar manner, the syphons 25 and 24 will be established with the nutrient liquid progressively flowing from one pan to the next lower pan and eventually back into the tank 30. All of the liquid in the pans will be removed by the syphon action with the exception of that remaining below the entrance opening of each syphon and this liquid is absorbed by the seeds during germination and growth thereof. The water level in the tank 30 is automatically maintained by the float valve 39 and when necessary, additional chemical nutrient is supplied thereto in order to maintain the concentration of the nutrient liquid at a desired value.

Upon completion of the growth of the feed, the pans are removed from the rack sufficiently to facilitate removal of the feed therefrom and thereupon additional seed is deposited in the pan and the process repeated.

It has been found that by the use of this invention that five pounds of seed will produce from twenty-five to thirty-five pounds of green feed in a period of approximately six days and that this process can be carried on continuously throughout the year and without regard to weather conditions, since the apparatus is disposed in a substantially weather-tight enclosure and the atmospheric conditions within the enclosure are maintained substantially constant by means of the air conditioning unit. Of course, if desired, in colder climates heating means may also be provided in order to maintain temperature conditions within the enclosure at the desired value.

Obviously, as many pans as desired may be installed and the ratio of production between the area required and the weight of feed obtained will remain substantially constant and consequently the requirements of any particular installation may be conveniently calculated in advance and such installation made with every expectation that sufficient feed for the purpose desired will be produced by the apparatus and that the natural raising of supplemental feed will be unnecessary, thereby permitting the use of available acreage for cultivation of other crops.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. An apparatus for the accelerated production of green feed for live stock, said apparatus comprising a normally hermetically sealed prefabricated enclosure dimensioned in accordance with the production requirements of said apparatus, means for maintaining predetermined conditions of temperature and humidity within said enclosure, an access door in said enclosure, a rack disposed in said enclosure and occupying a major portion of the floor area, a plurality of vertically spaced shelves on said rack, a culture pan slidably supported on each shelf, a self-priming syphon secured to each pan with the inlet end of said syphon disposed in close proximity to the bottom of said pan and the outlet end of said syphon disposed above the next lower pan in said rack, a nutrient liquid reservoir comprising an open top tank supported on the lowermost shelf of said rack, a water supply conduit connected to said tank, a float valve in said conduit for automatically maintaining a predetermined liquid level in said tank, a main shutoff valve in said conduit, a power driven pump, the intake of said pump being connected to said tank and the discharge of said pump being disposed to empty into the uppermost pan in said rack, valve controlled means for draining said tank and an adjustable time responsive control means for said pump, whereby said pump may be operated at predetermined intervals for a predetermined period of time to transfer nutrient liquid from said tank to the uppermost pan in said rack, said liquid progressively flowing from the uppermost pan to the lowermost pan as each syphon is established to facilitate germination and growth of seed disposed in said pans, such flow continuing until each pan is substantially empty and the liquid returned to said tank.

2. An apparatus for the accelerated production of green feed for live stock, said apparatus comprising an enclosure, means for maintaining predetermined conditions of temperature and humidity within said enclosure, an access door in said enclosure, a rack disposed in said enclosure, a plurality of vertically spaced shelves on said rack, a culture pan slidably supported on each shelf, a self-priming syphon secured to each pan with the inlet end of said syphon disposed in close proximity to the bottom of said pan and the outlet end of said syphon disposed above the next lower pan in said rack, a nutrient liquid reservoir comprising an open top tank supported on the lowermost shelf of said rack, a water supply conduit connected to said tank, a float valve in said conduit for automatically maintaining a predetermined liquid level in said tank, a main shutoff valve in said conduit, a power driven pump, the intake of said pump being connected to said tank and the discharge of said pump being disposed to empty into the uppermost pan in said rack, valve controlled means for draining said tank and an adjustable time responsive control means for said pump, whereby said pump may be operated at predetermined intervals for a predetermined period of time to transfer nutrient liquid from said tank to the uppermost pan in said rack, said liquid progressively flowing from the uppermost pan to the lowermost pan as each syphon is established to facilitate germination and growth of seed disposed in said pans, such flow continuing until each pan is substantially empty and the liquid returned to said tank.

3. An apparatus for the accelerated production of green feed for live stock, said apparatus comprising a rack, a plurality of vertically spaced shelves on said rack, a culture pan slidably supported on each shelf, a self-priming syphon secured to each pan with the inlet end of said syphon disposed in close proximity to the bottom of said pan and the outlet end of said syphon disposed above the next lower pan in said rack, a nutrient liquid reservoir comprising an open top tank supported on the lowermost shelf of said rack, a water supply conduit connected to said tank, a float valve in said conduit for automatically maintaining a predetermined liquid level in said tank, a main shutoff valve in said conduit, a power driven pump, the intake of said pump being connected to said tank and the discharge of said pump being disposed to empty into the uppermost pan in said rack, valve controlled means for draining said tank and an adjustable time responsive control means for said pump, whereby said pump may be operated at predetermined intervals for a predetermined period of time to transfer nutrient liquid from said tank to the uppermost pan in said rack, said liquid progressively flowing from the uppermost pan to the lowermost pan as each syphon is established to facilitate germination and growth of seed disposed in said pans, such flow continuing until each pan is substantially empty and the liquid returned to said tank.

4. An apparatus for the accelerated production of green feed for live stock, said apparatus comprising an enclosure, means for maintaining predetermined conditions of temperature and humidity within said enclosure, an access door in said enclosure, a rack disposed in said enclosure, a plurality of vertically spaced shelves on said rack, a culture pan slidably supported on each shelf, a self-priming syphon secured to each pan with the inlet end of said syphon disposed in close proximity to the bottom of said pan and the outlet end of said syphon disposed above the next lower pan in said rack, a nutrient liquid reservoir comprising an open top tank supported on the lowermost shelf of said rack, a power driven pump, the intake of said pump being connected to said tank and the discharge of said pump being disposed to empty into the uppermost pan in said rack, valve controlled means for draining said tank and an adjustable time responsive control means for said pump, whereby said pump may be operated at predetermined intervals for a predetermined period of time to transfer nutrient liquid from said tank to the uppermost pan in said rack, said liquid progressively flowing from the uppermost pan to the lowermost pan as each syphon is established to facilitate germination and growth of seed disposed in said pans, such flow continuing until each pan is substantially empty and the liquid returned to said tank.

5. An apparatus for the accelerated production of green feed for live stock, said apparatus comprising an enclosure, means for maintaining predetermined conditions of temperature and humidity within said enclosure, an access door in said enclosure, a rack disposed in said enclosure, a plurality of vertically spaced shelves on said rack, a culture pan slidably supported on each shelf, a self-priming syphon secured to each pan with the inlet end of said syphon disposed in close proximity to the bottom of said pan and the outlet end of said syphon disposed above the next lower pan in said rack, a nutrient liquid reservoir comprising an open top tank supported on the lower portion of said rack, a power driven pump, the intake of said pump being connected to said tank and the discharge of said pump being disposed to empty into the uppermost pan in said rack and an adjustable time responsive control means for said pump, whereby said pump may be operated at predetermined intervals for a predetermined period of time to transfer nutrient liquid from said tank to the uppermost pan in said rack, said liquid progressively flowing from the uppermost pan to the lowermost pan as each syphon is established to facilitate germination and growth of seed disposed in said pans, such flow continuing until each pan is substantially empty and the liquid returned to said tank.

6. An apparatus for the accelerated production of green feed for live stock, said apparatus comprising an enclosure, means for maintaining predetermined conditions of temperature and humidity within said enclosure, an access door in said enclosure, a rack disposed in said enclosure, a plurality of vertically spaced shelves on said rack, a culture pan supported on each shelf, a self-priming syphon secured to each pan with the outlet end of said syphon disposed above the next lower pan in said rack, a nutrient liquid reservoir comprising a tank supported on the lower portion of said rack, a power driven pump, the intake of said pump being connected to said tank and the discharge of said pump being disposed to empty into the uppermost pan in said rack and an adjustable time responsive control means for said pump, whereby said pump may be operated at predetermined intervals for a predetermined period of time to transfer nutrient liquid from said tank to the uppermost pan in said rack, said liquid progressively flowing from the uppermost pan to the lowermost pan as each syphon is established to facilitate germination and growth of seed disposed in said pans, such flow continuing until each pan is substantially empty and the liquid returned to said tank.

7. An apparatus for the accelerated production of green feed for live stock, said apparatus comprising a rack, a plurality of vertically spaced shelves on said rack, a culture pan supported on each shelf, a self-priming syphon secured to each pan with the outlet end of said syphon disposed above the next lower pan in said rack, a nutrient liquid reservoir comprising a tank supported on the lower portion of said rack, a power driven pump, the intake of said pump being connected to said tank and the discharge of said pump being disposed to empty into the uppermost pan in said rack and an adjustable time responsive control means for said pump, whereby said pump may be operated at predetermined intervals for a predetermined period of time to transfer nutrient liquid from said tank to the uppermost pan in said rack, said liquid progressively flowing from the uppermost pan to the lowermost pan as each syphon is established to facilitate germination and growth of seed disposed in said pans, such flow continuing until each pan is substantially empty and the liquid returned to said tank.

References Cited in the file of this patent

FOREIGN PATENTS

| | | |
|---|---|---|
| 473,279 | Great Britain | Oct. 4, 1937 |
| 744,200 | Great Britain | Feb. 1, 1956 |